United States Patent
Zhang et al.

(10) Patent No.: US 7,257,632 B2
(45) Date of Patent: Aug. 14, 2007

(54) METHOD AND APPARATUS FOR A BANDWIDTH BROKER IN A PACKET NETWORK

(75) Inventors: Zhi-Li Zhang, Minneapolis, MN (US); Yiwei Thomas Hou, Santa Clara, CA (US); Zhenhai Duan, Minneapolis, MN (US)

(73) Assignee: Fujitsu Limited, Kawasaki (JP)

( * ) Notice: Subject to any disclaimer, the term of this patent is extended or adjusted under 35 U.S.C. 154(b) by 600 days.

(21) Appl. No.: 09/919,365

(22) Filed: Jul. 30, 2001

(65) Prior Publication Data

US 2003/0028641 A1    Feb. 6, 2003

(51) Int. Cl.
*G06F 15/173* (2006.01)

(52) U.S. Cl. ...................... 709/226; 709/238
(58) Field of Classification Search ................ 709/226, 709/238, 239, 240, 242, 244
See application file for complete search history.

(56) References Cited

U.S. PATENT DOCUMENTS

| | | | |
|---|---|---|---|
| 6,173,406 B1 * | 1/2001 | Wang et al. | 713/201 |
| 6,223,292 B1 * | 4/2001 | Dean et al. | 713/202 |
| 6,307,839 B1 * | 10/2001 | Gerszberg et al. | 370/235 |
| 6,324,162 B1 * | 11/2001 | Chaudhuri | 370/225 |
| 6,330,609 B1 * | 12/2001 | Garofalakis et al. | 709/229 |
| 6,487,170 B1 * | 11/2002 | Chen et al. | 370/231 |
| 6,590,867 B1 * | 7/2003 | Ash et al. | 370/236 |
| 6,647,419 B1 * | 11/2003 | Mogul | 709/226 |
| 6,738,387 B1 * | 5/2004 | Lin et al. | 370/429 |
| 6,744,767 B1 * | 6/2004 | Chiu et al. | 370/395.21 |
| 6,813,272 B1 * | 11/2004 | An et al. | 370/395.21 |

FOREIGN PATENT DOCUMENTS

EP    1 047 226 A2    10/2000

(Continued)

OTHER PUBLICATIONS

Office Action dated Feb. 26, 2007 for Japan Patent Application No. 2002-216925, Applicant Fujitsu Limited, Office Action mailed Mar. 6, 2007, including English translation (10 pgs.).

*Primary Examiner*—John B. Walsh
(74) *Attorney, Agent, or Firm*—Christie, Parker & Hale, LLP

(57) ABSTRACT

A method and apparatus for allocating bandwidth within a network domain. A centralized bandwidth broker maintains a link-level database including detailed flow data for individual links in a network domain and a path-level database including summarized flow data for individual paths in the network domain. The bandwidth broker determines bandwidth allocations at a path-level by allocating discrete amounts of bandwidth, termed quotas, based on flow requests. If a flow request cannot be satisfied by allocating quotas, then the bandwidth broker uses the link-level database to recover bandwidth from unused bandwidth by other paths on the same link in order to satisfy the flow request. In another embodiment of a bandwidth broker, the centralized bandwidth broker is replaced by a distributed bandwidth broker including a central bandwidth broker and one or more edge bandwidth brokers. An edge bandwidth broker conducts path-level allocations and requests or releases quotas from and to the central bandwidth broker. The central bandwidth broker conducts link-level allocations and allocates or de-allocates quotas to and from the path maintained by the edge bandwidth broker.

16 Claims, 8 Drawing Sheets

FOREIGN PATENT DOCUMENTS

| | | |
|---|---|---|
| JP | 08-204724 | 8/1996 |
| JP | 08-251181 | 9/1996 |
| JP | 11-261596 | 9/1999 |
| JP | 11-346220 | 12/1999 |
| JP | 2000-316025 | 11/2000 |
| JP | 06-097952 | 2/2001 |
| JP | 2001-053795 | 2/2001 |

* cited by examiner

0. Upon an arrival of a new flow $f$ at a path $p$:
1. case 1: $(op_p == 0$ and $aqb_p \geq r_f)$ ~300
2. $R_p \leftarrow R_p + r_f$; accept the flow; return. ~302
3. case 2: $(op_p == 0$ and $aqb_p < r_f)$ ~304
4. request more quota on all the links $l: l \in p$ ~306
5. case 3: $(op_p > 0)$ ~308
6. request bandwidth $r_f$ on all critical links: $l \in cl_p$ ~310
7. for $l \notin cl_p$ ~312
8. if $(aqb_p < r_f)$ request more quota ~314
9. if (all requests are granted) ~316
10. update $Q_p$ if more quotas are allocated; ~318
11. $R_p \leftarrow R_p + r_f$; accept the flow; return. ~320
12. else reject the flow reservation set-up request. ~322

FIG. 3

0. Upon a path $p$ requests $r_p$ on a link $l$:
1. /* $r_p$ can be a quota or a flow's request rate */
2. case 1: $(op_l == 0 \text{ and } aq_l < r_p)$ ~400
3.     collect residual bandwidth: $rb_l \leftarrow C_l - \sum_{p: l \in p} R_p$; ~402
4.     if $(rb_l < r_p)$ reject the request; return. ~404
5. case 2: $(op_l == 1 \text{ and } rb_l < r_p)$ reject the request; return. ~406
6. /* The request can be honored */
7. if $(op_l == 0 \text{ and } aq_l < r_p)$ ~408
8. 410~ $op_l \leftarrow 1$; /* transition: normal $\rightarrow$ critical */
9. for $(p' : l \in p')$ ~412
10.     $cl_{p'} \leftarrow cl_{p'} \cup l$; $op_{p'} \leftarrow op_{p'} + 1$; ~414
11. case 1: $(op_l == 0)$ $aq_l \leftarrow aq_l - 1$ ~416
12. case 2: $(op_l == 1)$ $rb_l \leftarrow rb_l - r_p$. ~418

FIG. 4

0. Upon an existing flow $f$ departs on a path $p$:
1. $R_p \leftarrow R_p - r_f$; ~500
2. if $(op_p > 0)$ ~502
3.    for $(l \in cl_p)$ ~504
4.       506 ~ $rb_l \leftarrow rb_l + r_f$; recompute $aq_l$;
5. 510 ~ if $(aq_l \geq 0)$ /* transition: critical $\rightarrow$ normal */ ~508
6.       for $(p' : l \in p')$ ~512
7.          $op_{p'} \leftarrow op_{p'} - 1$; set $Q_{p'}$; ~514
8.          $cl_{p'} \leftarrow cl_{p'} - l$; ~516 ~518
9. else if $(op_p == 0$ and $p$ has excess quota)
10. 520 ~ $Q_p \leftarrow Q_p - 1$; /* return excess quota */
11.    for $(l \in p)$ ~522
12.       $aq_l \leftarrow aq_l + 1$; ~524

FIG. 5

METHOD AND APPARATUS FOR A BANDWIDTH BROKER IN A PACKET NETWORK

BACKGROUND OF THE INVENTION

This invention relates generally to the field of computer networks and more specifically to quality of service provisioning within a computer network.

A network domain may have a special network server, herein termed a bandwidth broker, responsible for maintaining the network Quality of Service (QoS) states and performing various QoS control and management functions such as admission control, resource reservation and provisioning for the entire network domain. A centralized bandwidth broker for the control and management of QoS provisioning may reduce the complexity of a QoS control plane.

A centralized bandwidth broker for QoS control and management has several appealing features. For example, a centralized bandwidth broker may decouple a QoS control plane from a data plane. In particular, QoS control functions such as admission control and QoS state maintenance are removed from the core routers of a network domain located within the data plane, thus reducing the complexity of the core routers. Consequently, hop-by-hop signaling for reservation set-up along the path may be eliminated, thus removing signaling overhead from the core routers. Furthermore, because network QoS states may be centrally managed by the bandwidth broker, the problems of unreliable or inconsistent control states may be circumvented. In this respect, a centralized bandwidth broker may provide a scalable alternative for QoS control and management.

However, a centralized bandwidth broker for QoS control and management also introduces its own scalability issue, in particular, the ability of a bandwidth broker to handle large volumes of flows as the network system scales. In a network where only slow time scale, static resource provisioning and traffic engineering (e.g., those performed to set up virtual private networks) are performed, the scalability problem may not be acute. But with the rapid evolution of today's Internet, many new applications and services such as Voice over IP (VoIP), on-demand media streaming and real-time content delivery (e.g., stock quotes and news) may require dynamic QoS control and management such as admission control and resource provisioning at the time scale of flow arrival and departure. In these circumstances, an inappropriately centralized bandwidth broker system can become a potential bottleneck, limiting the number of flows that can be accommodated into the network system, while the network system itself is still under-loaded.

One measure of scalability is the ability of a bandwidth broker system to handle large volumes of flow reservation requests, as the network system increases in size. For example, as the network link capacity increases, the call processing capability of a bandwidth broker system, herein defined as the number of flow requests that can be processed by the bandwidth broker system per unit of time, should increase proportionally with increasing numbers of flows that can be accommodated in the network system. In particular, a bandwidth broker should not become a bottleneck while the network system has not been overloaded.

Although it may be possible to enhance the call processing capability of a bandwidth broker by simply adding more processing power or increasing memory and disk access speed, such an approach in itself may not provide a scalable bandwidth broker. There are many factors that may potentially affect the call processing capability of a bandwidth broker. Among them, the speed of memory and disk accesses may play a prominent role. When processing a flow reservation set-up request, a bandwidth broker performs an admissibility test, and if the request can be granted, the bandwidth broker updates the relevant QoS states. Likewise, when processing a flow reservation tear-down request, a bandwidth broker updates the relevant QoS states. In either case, access and/or update to QoS states are involved. Since memory/disk access speed is typically much slower than processing speed, the processing time of flow requests may be determined in a large part by the number of memory/disk accesses and updates.

Another factor that may affect the overall call processing capability of a centralized bandwidth broker is the capacity of the communication channels (e.g., the network or I/O bandwidth) between a centralized bandwidth broker and various edge routers. As the number of flows increases, these communication channels may become a bottleneck, limiting the number of flow requests delivered to a centralized bandwidth broker system, thereby reducing a centralized bandwidth broker's overall call processing capability. To scale with the demand of the network system, a distributed multiple-bandwidth-broker architecture may be called for.

SUMMARY OF THE INVENTION

In one aspect of the invention, a method for allocating bandwidth within a network domain by a network server operably coupled to a network domain edge node is provided. The method includes providing a database operably coupled to the network server, the database including path-level data and link-level data for a path within the network domain. The network server receives from the network domain edge node a flow request for the path. The network server satisfies the flow request using the link-level data if the network server determines the network server cannot satisfy the flow request using the path-level data.

In another aspect of the invention, the path-level data includes unused bandwidth allocated to the path and a path state, and the network server satisfies the flow request using the unused bandwidth if the path is not in a critical state and the path has enough unused bandwidth to satisfy the flow request.

In another aspect of the invention, the link-level data further includes quotas of bandwidth available to a link and the network server allocates to each link along the path a quota of bandwidth from the quotas of bandwidth available to the link if the path does not have enough unused bandwidth to satisfy the flow request.

In another aspect of the invention, the link-level data further includes a link state and the path-level data further includes a set of critical links along the path, the network server allocates bandwidth to each link in the set of critical links from unused bandwidth reclaimed from another path on each link.

In another aspect of the invention, the network server is a distributed network server, the distributed network server including a central network server and a plurality of edge network servers. The central network server is operably coupled to a link-level database and each of the plurality of edge network servers are coupled to a path-level database. The distributed network server receives from a network domain edge node operably coupled to an edge network server a flow request for a path. The distributed network server then satisfies the flow request using the link-level data if the network server determines the distributed network server cannot satisfy the flow request using the path-level data.

In another aspect of the invention, a data processing system is adapted to allocate bandwidth within a network domain. The data processing system includes a database including path-level data and link-level data for a path within the network domain, a processor, and a memory operably coupled to the processor. The memory has program instructions stored therein, the processor being operable to execute the program instructions. The program instructions include receiving from a network domain edge node a flow request for the path and satisfying the flow request using the link-level data if the flow request cannot be satisfied using the path-level data.

Another aspect of the present invention provides a computer readable medium embodying program instructions for execution by a computer, the program instructions adapting a computer to allocate bandwidth within a network domain, program instructions comprising: accessing a database including path-level data and link-level data for a path within the network domain; receiving from a network domain edge node a flow request for a path; and satisfying the flow request using the link-level data if the flow request cannot be satisfied using the path-level data. One aspect of the invention provides the above computer readable medium, wherein the path-level data includes unused bandwidth allocated to the path and a path state, the program instructions further comprising satisfying the flow request using the unused bandwidth if the path is not in a critical state and the path has enough unused bandwidth to satisfy the flow request. One aspect of the invention provides the above computer readable medium, wherein the link-level data further includes quotas of bandwidth available to a link, the program instructions further comprising allocating to each link along the path a quota of bandwidth from the quotas of bandwidth available to the link if the path does not have enough unused bandwidth to satisfy the flow request. One aspect of the invention provides the above computer readable medium, wherein the link-level data further includes a link state and the path-level data further includes a set of critical links along the path, the program instructions further comprising allocating bandwidth to each link in the set of critical links from unused bandwidth reclaimed from another path on each link.

BRIEF DESCRIPTION OF THE DRAWINGS

These and other features, aspects, and advantages of the present invention will become better understood with regard to the following description and accompanying drawings where:

FIG. 3 describes an exemplary path-level admission control process for a bandwidth broker using Path-oriented, Quota-based dynamic bandwidth allocation (PoQ) for flow reservation set-up and quota allocation management;

FIG. 4 describes an exemplary link-level bandwidth allocation and quota allocation management process used in an embodiment of a bandwidth broker according to the present invention;

FIG. 5 describes an exemplary path-level and link-level bandwidth and quota management process for handling flow departures by a bandwidth broker according to the present invention;

DETAILED DESCRIPTION OF THE INVENTION

Figure 1:
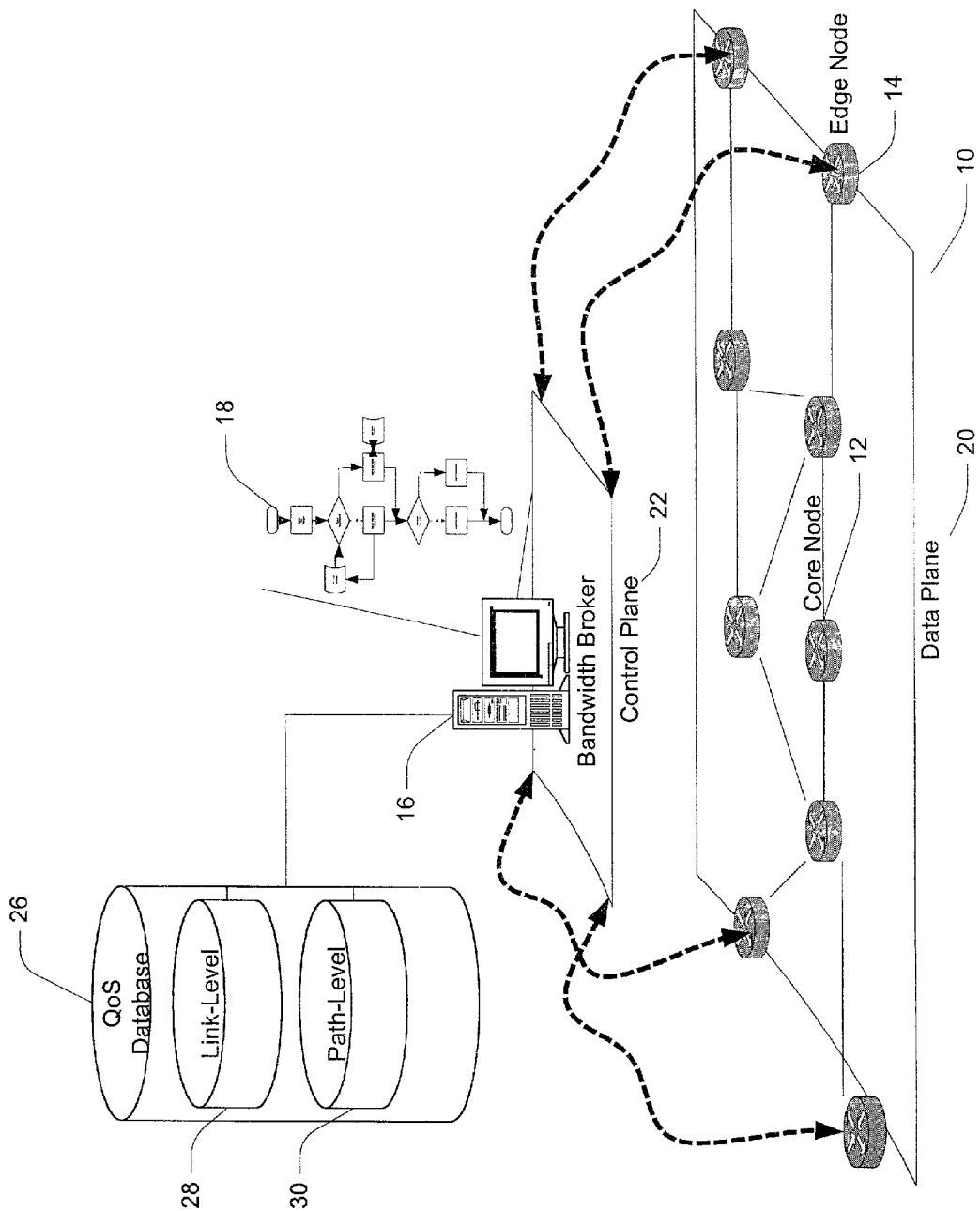
FIG. 1 depicts an exemplary embodiment of a centralized bandwidth broker for the management and control of QoS provisioning of a network domain.

FIG. 1 depicts an exemplary embodiment of a centralized bandwidth broker for the management and control of QoS provisioning of a network domain. A network domain 10 is defined by a plurality of operably coupled core nodes, as exemplified by core node 12. The core nodes are operably coupled to other domains via edge nodes, as exemplified by edge node 14. A bandwidth broker data processing system 16 includes a bandwidth broker host and programming instructions 18 implementing a bandwidth broker.

Figure 2:
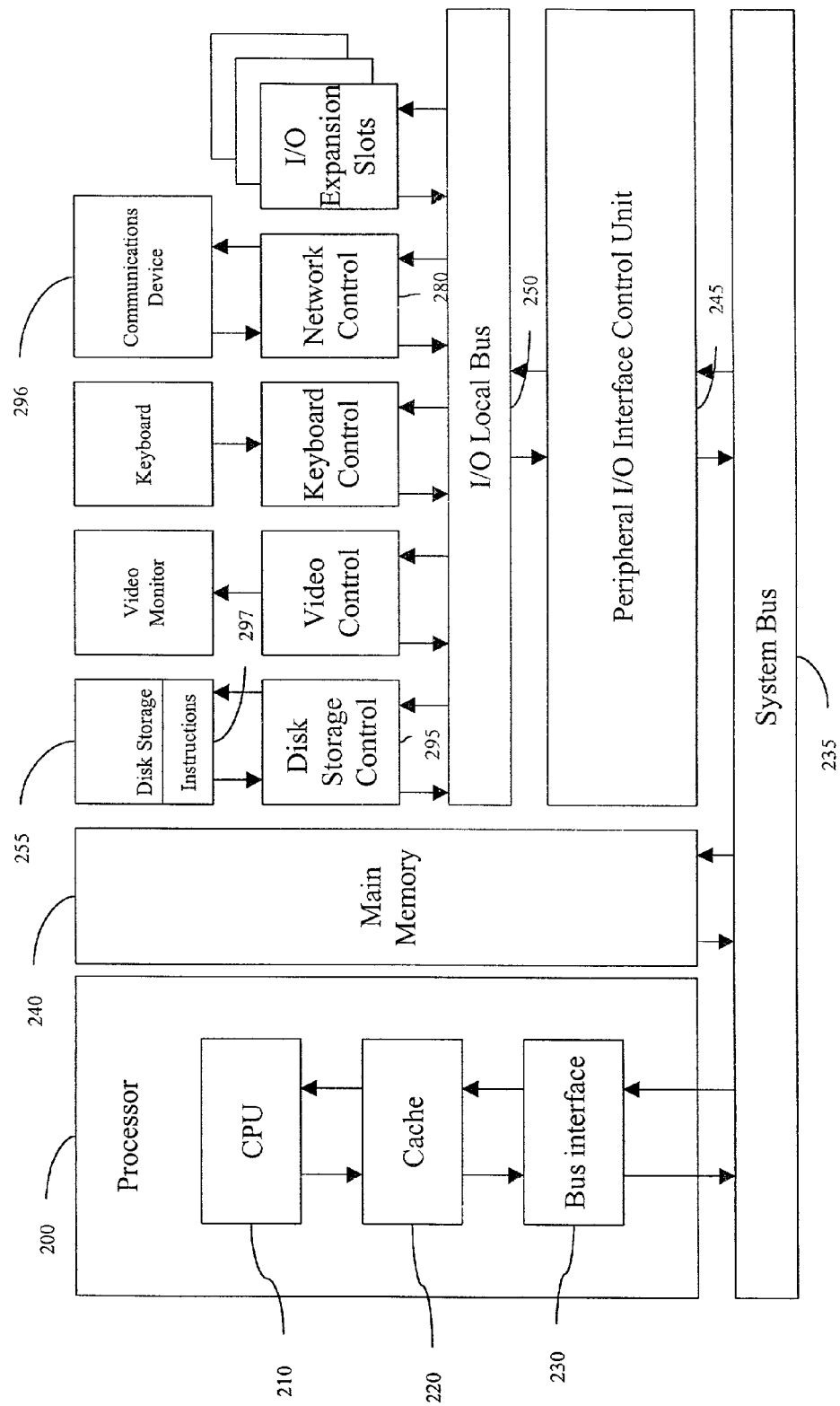
FIG. 2 is a hardware architecture diagram of a general purpose computer suitable for use as a bandwidth broker host.

FIG. 2 is a hardware architecture diagram of a general purpose computer suitable for use as a bandwidth broker host. A processor 200, comprising a Central Processing Unit (CPU) 210, a memory cache 220, and a bus interface 230, is operatively coupled via a system bus 235 to a main memory 240 and a I/O control unit 245. The I/O interface control unit is operatively coupled via a I/O local bus 250 to a disk storage controller 295, and a network controller 280.

The disk storage controller is operatively coupled to a disk storage device 255. Computer program instructions 297 for implementing a bandwidth broker are stored on the disk storage device until the processor retrieves the computer program instructions and stores them in the main memory. The processor then executes the computer program instructions stored in the main memory to implement the features of a bandwidth broker.

The network controller is operatively coupled to communications device 296. The communications device is adapted to allow a bandwidth broker hosted by the general purpose computer to communicate via a computer network such as the Internet with other software objects such as a user client via the computer network.

Referring again to FIG. 1, the bandwidth broker is operably coupled to the plurality of edge nodes defining the network domain as exemplified by edge node 14. The network of core and edge nodes define a data plane 10 through which data flows. The bandwidth broker occupies a control plane 22 that includes systems and data for the control of flow through the data plane. The bandwidth broker system further includes a network topology database (not shown) and a network QoS state database 26 operably coupled to the bandwidth broker.

The network topology database and the network QoS state databases together provide a logical representation, herein termed a QoS abstraction, of the network domain and its state. With this QoS abstraction of the network domain, the bandwidth broker performs QoS control functions by managing and updating these databases. Thus the QoS control plane of the network domain is decoupled from the network domain's data plane. The core routers of the network domain are removed from the QoS control plane because the core routers do not maintain any QoS reservation states, whether per-flow or aggregate, and do not perform any QoS control functions such as admission control.

The network QoS states are represented at two levels in the network QoS state database by the bandwidth broker, a link-level 28 and a path-level 30. At the link-level, the bandwidth broker maintains information regarding the QoS state of each link in the network domain including the total reserved bandwidth and the available bandwidth of the link. At the path-level, the bandwidth broker maintains QoS state information regarding each path of the network domain, which is extracted and "summarized" from the link QoS states of the links of the path. An example of a path QoS state is the available bandwidth along a path, which is the minimal available bandwidth among all its links. By maintaining a separate path-level QoS state, the bandwidth broker can conduct a fast admissibility test for flows routed along the path. Furthermore, path-wise resource optimization can also be performed based on the summarized path QoS state. Finally, both the link QoS states and path QoS states are aggregate QoS states regarding the links and paths. Per-flow QoS states need not be maintained in the network QoS state database. QoS and other control state information regarding each flow, such as the flow's QoS requirement and reserved bandwidth, are maintained in a separate flow information database (not shown) operably coupled to and managed by the bandwidth broker.

The bandwidth broker uses a dynamic bandwidth allocation mechanism, herein termed Path-oriented, Quota-based dynamic bandwidth allocation (PoQ), for performing admission control. PoQ exploits the two-level representation of the network QoS states used by the bandwidth broker, and avoids accessing and updating the link QoS states every time a flow reservation set-up or tear-down request is processed. Under PoQ, the total bandwidth of each link of the network is divided into discrete amounts of bandwidth, herein termed quotas. A quota is larger than an average bandwidth requirement for a typical flow.

Quota allocation for a path can fail if a link along the path does not have sufficient quotas left. In this case, bandwidth allocation for the path enters into a state herein termed a critical state. More generally, when the available quota of a link falls below a threshold (say, no quota left), the link is herein termed a critical link and is in a critical state. When a link is in a critical state, all paths traversing the link enter the critical state. Once a path is in the critical state, the bandwidth broker ceases allocating bandwidth along the path in units of quota. Instead, bandwidth is allocated or de-allocated on a per-flow basis. In particular, the bandwidth broker maintains an accurate link QoS state for each critical link (for example, the precise amount of reserved bandwidth at the link). Hence when processing a flow reservation set-up or tear-down request for a path in a critical state, the bandwidth broker accesses and updates the link QoS states of those critical links along a critical path. This switch to a link-update admission control scheme by the bandwidth broker ensures that no flow reservation set-up request will be rejected unnecessarily.

Similarly, when a flow reservation tear-down request arrives for a path, the bandwidth broker updates the path's QoS state (i.e., the actual reserved bandwidth of the path is decreased by the amount reserved for the flow).

Figure 8:
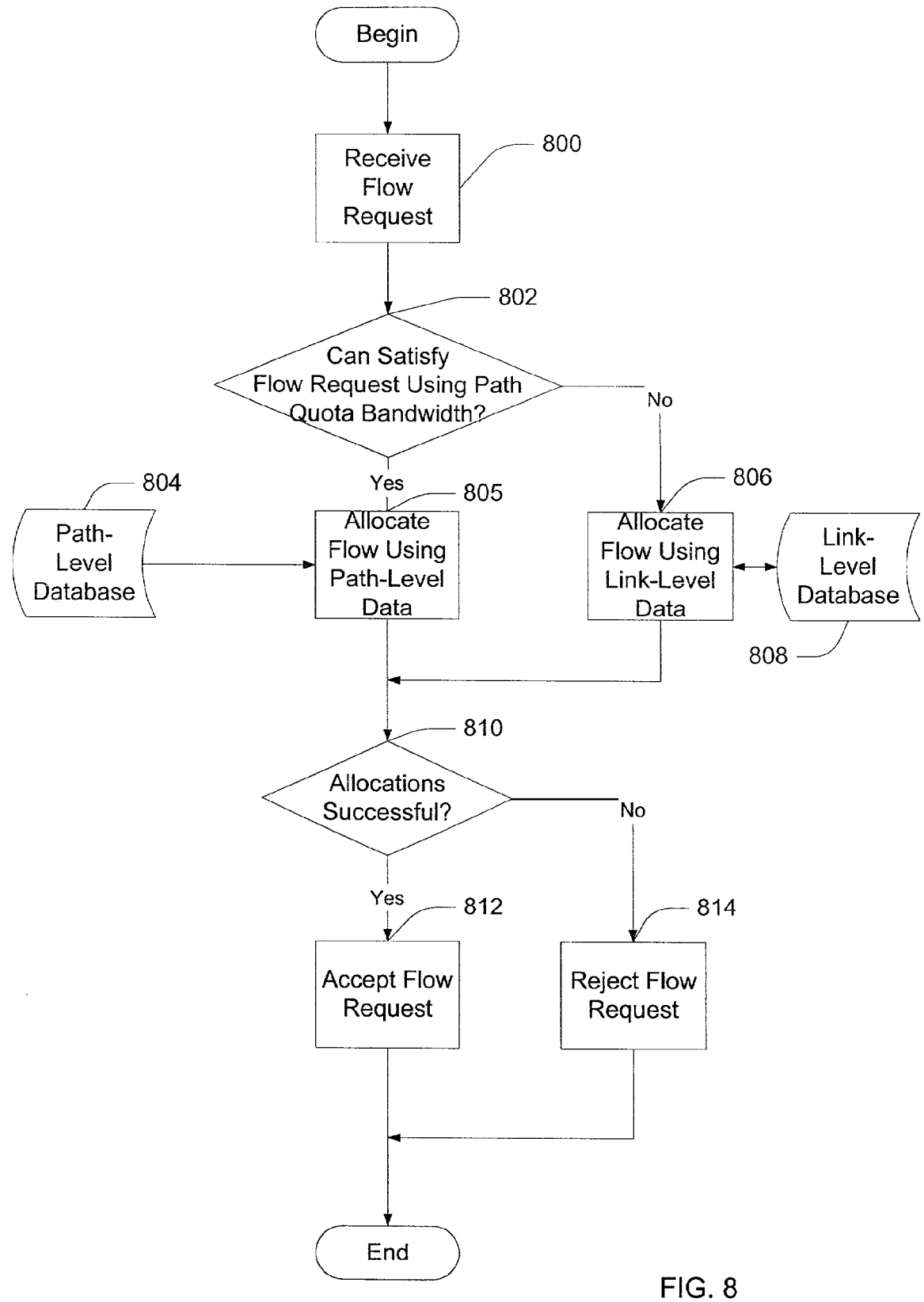
FIG. 8 is a diagram depicting an exemplary allocation process within an embodiment of a bandwidth broker according to the present invention.

FIG. 8 is a diagram depicting an exemplary allocation process within an embodiment of a bandwidth broker according to the present invention. A bandwidth broker receives a flow request for a path at step 800. At step 802, the bandwidth broker determines if the path has sufficient quotas allocated to the path to satisfy the flow request using a path-level database 804. If so, the bandwidth broker admits the flow and allocates the flow request to the path and updates the path-level database. If the bandwidth broker determines that the path does not have sufficient quotas allocated to the path to satisfy the flow request at step 802, the bandwidth broker allocates flow at step 806 to the path using a link-level database 808. The bandwidth broker determines if the bandwidth broker was successful in allocating flow to the path at step 810. If so, the bandwidth broker admits the flow at step 812. If the bandwidth broker was unsuccessful in allocating flow to the path, the bandwidth broker rejects the flow at step 814.

A more detailed exemplary PoQ process used by an embodiment of a bandwidth broker according to the present invention is illustrated using pseudo-code in FIG. 3, FIG. 4, and FIG. 5. The following table summarizes the symbols used within the pseudo-code:

| | |
|---|---|
| $op_p$ | Path critical state for path p. If $op_p$ is equal to 0, then path p is in the normal state. If $op_p > 0$, then path p is in the critical state |
| $cl_p$ | List of critical links along path p. |
| $R_p$ | Total reserved rate along path p. |
| $Q_p$ | Number of quotas allocated to path p. |
| $aqb_p$ | Unused bandwidth on path p, equal to the difference between $Q_p$ and $R_p$. |
| $op_l$ | Link critical flag. If $op_l$ is equal to 0, then link l is not critical. If $op_l$ is equal to 1, then link l is critical. |
| $r_f$ | Flow request. |
| $C_l$ | Capacity of link l. |
| $Q_l$ | Total quotas of link l. |
| $aq_l$ | Available quotas for link l. |
| $rb_l$ | Available bandwidth for link l. |

FIG. 3 describes an exemplary path-level admission control process for a bandwidth broker using PoQ for flow reservation set-up and quota allocation management. During a normal mode, the bandwidth broker allocates and de-allocates bandwidth in units of one quota at a time. The path-level QoS state of a path maintains the number of quotas of bandwidth that have been allocated to the path, in addition to the actual bandwidth that has been reserved for the flows routed along the path. When a flow reservation set-up request for flow along a path arrives, the bandwidth broker determines if path is in a normal state and the unused bandwidth allocated to the path are sufficient to satisfy the flow request at step 300. If so, the flow request is accepted and the relevant path QoS state is updated accordingly at step 302. (i.e., the actual reserved bandwidth along the path is increased by the amount of the flow request).

If, at step 304, the bandwidth broker determines that the bandwidth allocated to the path is insufficient to satisfy the flow request, the bandwidth broker will attempt to allocate a new quota to the path to accommodate the flow request at step 306. To do so, the bandwidth broker requests new quota allocations for each link along the path in a to be described process.

If the bandwidth broker determines at step 308 that the path is in a critical state, then the bandwidth broker requests more bandwidth to be allocated for each link in the path's critical link list in a to be described process at step 310. For each link 1 not in the path's critical link list, as determined by the bandwidth broker at step 312, the bandwidth broker determines if the path's allocated quotas are sufficient and requests more quotas in a to be described process if the path's allocated quotas are insufficient.

After the bandwidth broker has processed the flow request, the bandwidth broker determines if all of the bandwidth broker's bandwidth and quota requests have been granted at step 316. If all of the bandwidth broker's bandwidth and quota requests have been granted, the bandwidth broker updates the amount of quotas allocated to the path, updates the amount of total reserved rate along the path, and accepts the flow request at step 320. If the bandwidth broker determines at step 316 that not all of the bandwidth broker's bandwidth and quota requests have been granted, then the bandwidth broker rejects the flow request at step 322.

FIG. 4 describes an exemplary link-level bandwidth allocation and quota allocation management process used in an embodiment of a bandwidth broker according to the present invention. The process allocates a requested flow, $r_p$, for a link 1. In a first possible case, at step 400, the bandwidth broker determines if the link is in a normal state and if the requested flow is greater than the link's available quota. If so, the bandwidth broker reclaims any unused bandwidth from all paths on link 1 at step 402. After reclaiming unused bandwidth from all paths on link 1, the bandwidth broker determines if the amount of reclaimed bandwidth is sufficient to satisfy the flow request at step 404. If not, the flow request is rejected.

In a second possible case, at step 406, the bandwidth broker determines if the link is in a critical state and if the amount of bandwidth reclaimed from unused bandwidth from all paths on link 1 is less than the requested flow. If so, the bandwidth broker rejects the request. If the bandwidth broker is able to reclaim enough bandwidth to satisfy the flow request in the first case, the bandwidth broker determines if the link is in a normal state at step 408. If so, the bandwidth broker sets the state of the link to the critical state at step 410. If the bandwidth broker sets the state of the link to the critical state, then the bandwidth broker determines which paths the link is a member of at step 412. For each path the link is a member of, the bandwidth broker adds the link to the path's critical link list and increments the path's state by one at step 414.

If the bandwidth broker was able to satisfy the flow request because the link's available quota was sufficient to satisfy the flow request, the bandwidth broker decrements the link's available quota at step 416. If the bandwidth broker was able to satisfy the flow request for a link in a critical state, the bandwidth broker decrements the amount of available link bandwidth by the amount of the flow request at step 418.

FIG. 5 describes an exemplary path-level and link-level bandwidth and quota management process for handling flow departures by a bandwidth broker according to the present invention. When a flow f departs a path p, the bandwidth broker reclaims the amount of flow reserved bandwidth along the path for the departed flow at step 500. The bandwidth broker determines if the path was in a critical state at step 502. If so, for each link 1 in the path's critical link list, as determined by the bandwidth broker at step 504, the bandwidth broker reclaims the amount of bandwidth previously allocated to the departed flow and recalculates the link's allocated quotas at step 506.

If the bandwidth broker determines that the link's recalculated allocation of quotas is sufficient to accept a new flow request, namely the allocation of quotas to the link is greater than zero, the bandwidth broker resets the state of the link from critical to normal at step 510. For each path p' of which the link is a member, as determined by the bandwidth broker at step 512, the bandwidth broker decrements path p''s critical path state at step 514. The bandwidth broker then removes the link from path p''s critical link list at step 516.

If the bandwidth broker determined the path was not in a critical state at step 502, the bandwidth broker determines if the path had excess quotas assigned to the path at step 518. If so, the path's excess quota is decremented from the path at step 520. For each link 1 in the path, as determined by the bandwidth broker at step 522, the bandwidth broker returns the extra quota to each link along the path by incrementing the available number of quotas at the link.

In another embodiment of a bandwidth broker according to the present invention, a centralized bandwidth broker architecture with a single bandwidth broker is extended to a hierarchically distributed architecture with Multiple Bandwidth Brokers (MBBs). A MBB architecture may use a PoQ to allocate bandwidth within a network domain.

Figure 6:
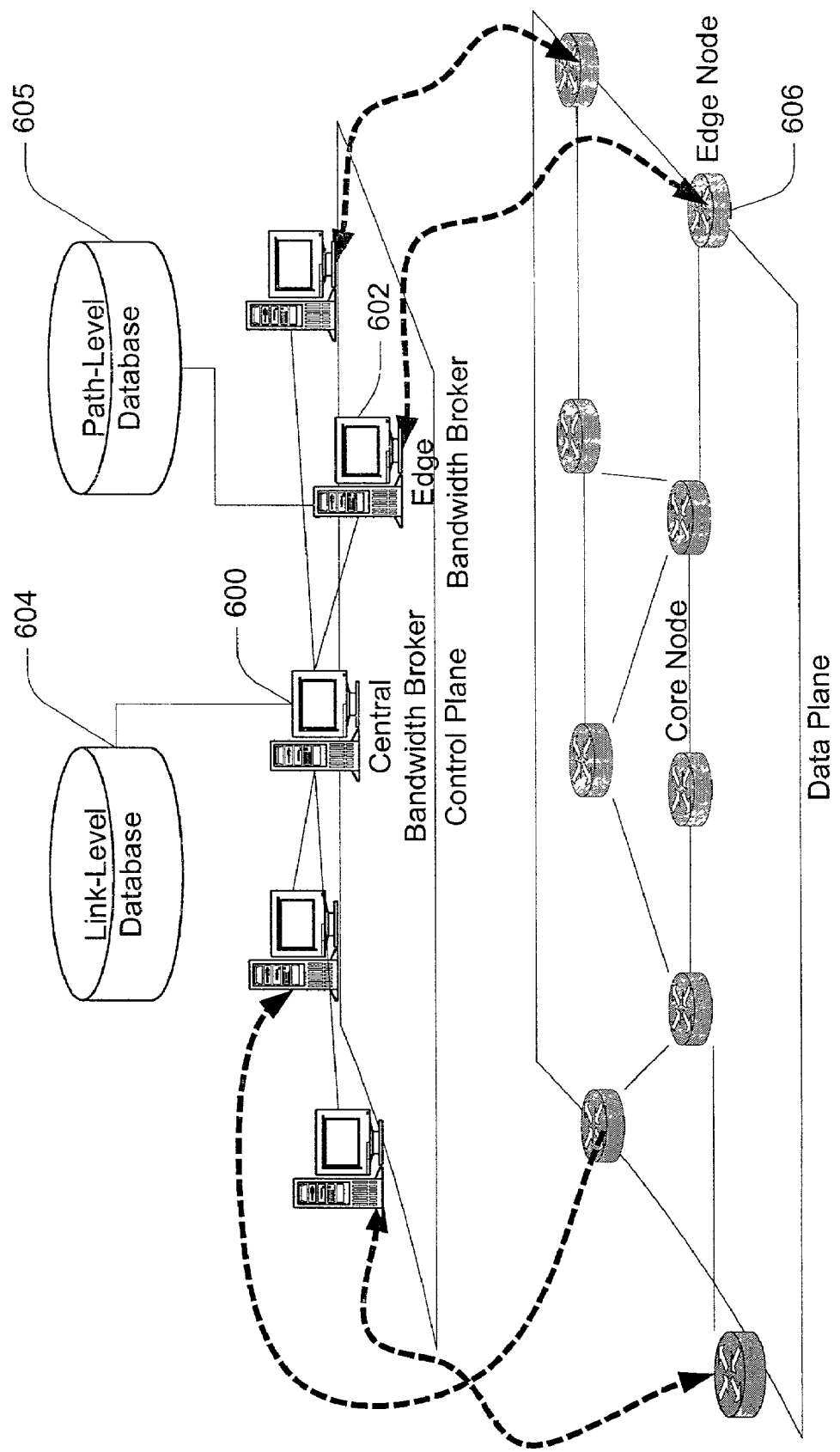
FIG. 6 is a diagram depicting an exemplary multiple bandwidth broker architecture according to the present invention.

FIG. 6 is a diagram depicting an exemplary MBB architecture according to the present invention. A hierarchically distributed MBB architecture includes a previously described two-level network QoS representation of a PoQ architecture. The MBB architecture consists of a central bandwidth broker 600 and a plurality of edge bandwidth brokers operably coupled to the central bandwidth broker as exemplified by edge bandwidth broker 602. The central bandwidth broker maintains a previously described link QoS state database 604 and manages quota allocation and deallocation among the plurality of edge bandwidth brokers. Each of the plurality of edge bandwidth brokers manages a subset of path QoS states and performs admission control for paths through an operably coupled edge node such as exemplary edge node 606. The number of edge bandwidth brokers can vary, depending on the size of a network domain. For example, an edge bandwidth broker can be provided for each edge router as shown in FIG. 6., and each edge bandwidth broker can co-locate at the edge router.

Figure 7:
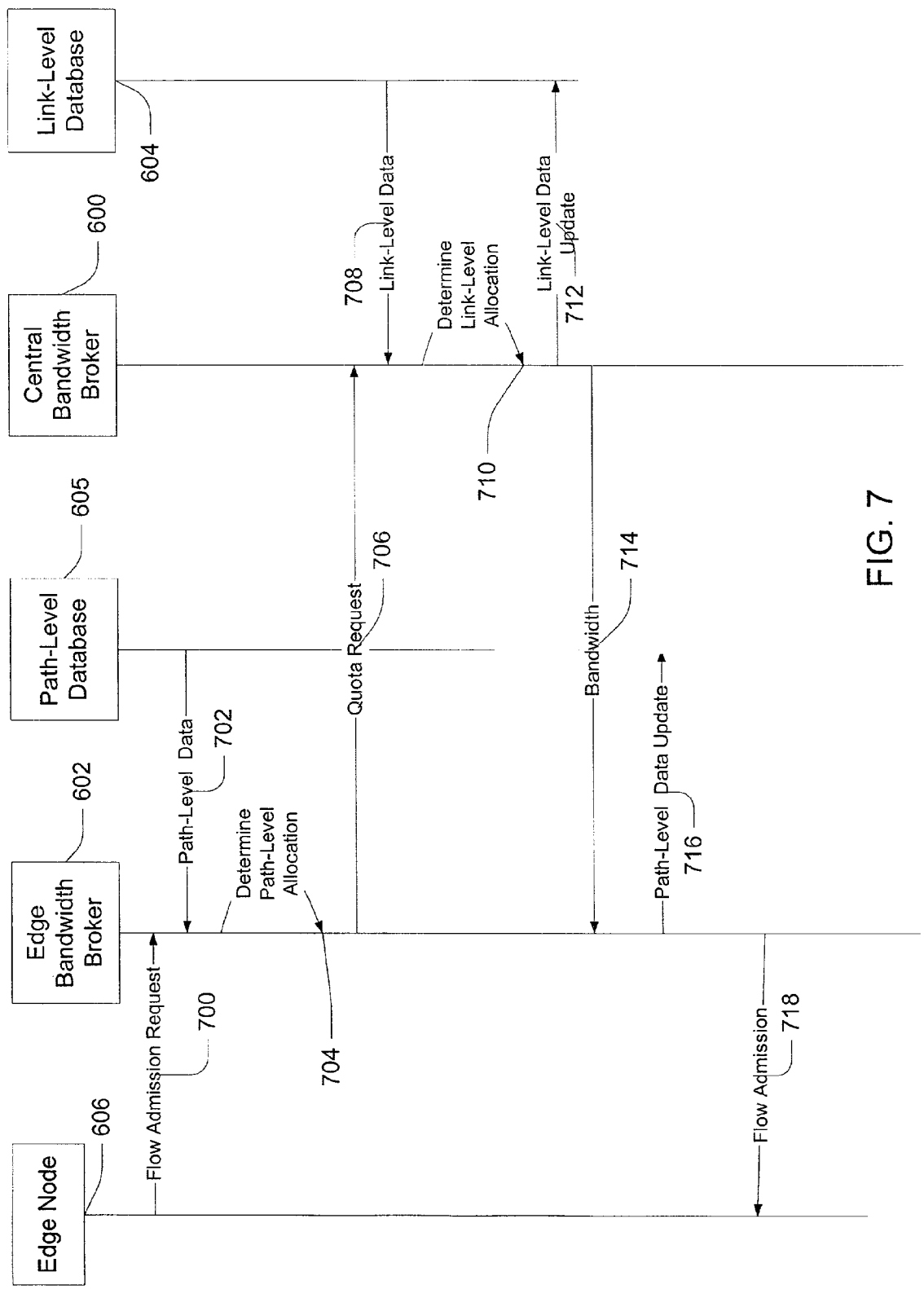
FIG. 7 is a diagram depicting an exemplary sequence of operations within an embodiment of a distributed bandwidth broker according to the present invention.

FIG. 7 is a diagram depicting an exemplary sequence of operations within an embodiment of a distributed bandwidth broker according to the present invention. When a flow for a path arrives at an edge node 606, the edge node 606 transmits a flow admission request 700, to an edge bandwidth broker 602. The edge bandwidth broker gets path-level data 702 from a path-level database 605. The edge bandwidth broker makes 704 admission control decisions based on the path data as previously described. If the flow request is granted by the edge bandwidth broker, the edge bandwidth broker admits the flow by transmitting a flow admission 718 to the edge node and updating the flow's path QoS state 716.

If insufficient bandwidth is available on the path, the edge bandwidth broker transmits a request 706 for a new quota for the path from a central bandwidth broker 600. If the quota request fails (i.e., no more quota available at the central bandwidth broker), the central bandwidth broker gets link-level data 708 from a link-level database 604 and performs admission control 710 using the previously described per-flow link-update scheme. If allocation is successful, the central bandwidth broker transmits a link-level data update 712 to the link-level database and transmits a bandwidth allocation 714 to the edge bandwidth broker.

In one embodiment of a MBB architecture according to the present invention, the MBB architecture uses a modified PoQ, herein termed a lossy-path PoQ, to allocate bandwidth within a network domain. Within a lossy-path PoQ scheme, when a quota request fails, the edge bandwidth broker rejects the flow reservation request instead of passing the flow request to the central bandwidth broker for a link-level admission using the previously described per-flow link-update scheme.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by claims supported by this application and the claims' equivalents rather than the foregoing description.

What is claimed is:

1. A method for allocating bandwidth within a network domain by a network server operably coupled to a network domain edge node and to a database, the network domain including links for connecting two nodes, the method comprsing:

accessing the database, the database including path-level data comprising Quality of Service (QoS) information for paths, the paths including a plurality of links for connecting two edge nodes, and link-level data comprising QoS information for the links, the path-level data being summarized from the link-level data;

receiving from the network domain edge node a flow request for a requested path;

satisfying the flow request using the path-level data if the network server determines the network server can satisfy the flow request using the path-level data; and satisfying the flow request using the link-level data if the network server determines the network server cannot satisfy the flow request using the path-level data, wherein the path-level data includes for each path unused bandwidth allocated to the path and a path state including a critical state and a non-critical state, the method further comprising satisfying the flow request using the unused bandwidth if the requested path is not in a critical state and if the requested path has enough unused bandwidth to satisfy the flow request, and wherein the link-level data includes for each link quotas of bandwidth available to the link, the method further comprising allocating by the network server to each link along the requested path a quota of bandwidth from the quotas of bandwidth available to the link if the requested path does not have enough unused bandwidth to satisfy the flow request.

2. The method of claim 1, wherein the link-level data further includes for each link a link state including a critical state having an unused bandwidth below a threshold level and a non-critical state, a link in the critical state being a critical link, and the path-level data further includes for each path a set of critical links along the path, the method further comprising allocating to each link in the set of critical links bandwidth reclaimed from unused bandwidth of another path including the link.

3. A method for allocating bandwidth within a network domain by a distributed network server, the distributed network server including a central network server and a plurality of edge network servers, comprising:

providing a plurality of path-level databases operably coupled to the plurality of edge network servers, the path-level databases including path-level data comprising Quality of Service (QoS) state information for paths within the network domain;

providing a link-level database operably coupled to the central network server, the link-level database including link-level data comprising QoS information for links in the paths within the network domain, the path-level data being summarized from the link-level data, each of the link connecting two nodes and each of the paths including one or more links;

receiving by the distributed network server from a network domain edge node operably coupled to an edge network server a flow request for a path within the network domain;

satisfying by the distributed network server the flow request using the path-level data if the network server determines the distributed network server can satisfy the flow request using the path-level data; and satisfying by the distributed network server the flow request using the link-level data if the network server determines the distributed network server cannot satisfy the flow request using the path-level data, wherein the path-level data includes unused bandwidth allocated to the path and a path state, the method further comprising satisfying by the edge network server the flow request using the unused bandwidth if the path is not in a critical state and the unused bandwidth is sufficient to satisfy the flow request, wherein the link-level data further includes quotas of bandwidth available to a link, the method further comprising allocating by the central network server to each link along the path a quota of bandwidth from the quotas of bandwidth available to the link if the path does not have enough unused bandwidth to satisfy the flow request, and wherein the link-level data further includes quotas of bandwidth available to a link, the method further comprising allocating by the central network server to each link along the path a quota of bandwidth from the quotas of bandwidth available to the link if the path does not have enough unused bandwidth to satisfy the flow request.

4. The method of claim 3, wherein the link-level data further includes a link state and the path-level data further includes a set of critical links along the path, the method further comprising allocating by the central network server bandwidth to each link in the set of critical links from unused bandwidth reclaimed from another path on each link.

5. The method of claim 3, the method further comprising rejecting by the edge network server the flow request if a link along the path does not have a quota of bandwidth available to the link for satisfying the flow request.

6. A data processing system adapted to allocate bandwidth within a network domain, comprising:

a database including path-level data comprising Quality of Service (QoS) information for each path within the network domain and link-level data comprising QoS information for each link within the network domain, the path-level data being summarized from the link-level data, each of the paths comprising a plurality of links;

a processor; and a memory operably coupled to the processor and having program instructions stored therein, the processor being operable to execute the program instructions, the program instructions including:

receiving from a network domain edge node a flow request for a path;

satisfying the flow request using the path-level data if the flow request can be satisfied using the path-level data; and satisfying the flow request using the link-level data if the flow request cannot be satisfied using the path-level data,
wherein the link-level data further includes quotas of bandwidth available to a link, the program instructions further including allocating to each link along the path a quota of bandwidth from the quotas of bandwidth available to the link if the path does not have enough unused bandwidth to satisfy the flow request.

7. The data processing system of claim 6, wherein the path-level data includes unused bandwidth allocated to the path and a path state, the program instructions further including satisfying the flow request using the unused bandwidth if the path is not in a critical state and the path has enough available unused bandwidth to satisfy the flow request.

8. The data processing system of claim 6, wherein the link-level data further includes a link state and the path-level data further includes a set of critical links along the path, the program instructions further including allocating bandwidth to each link in the set of critical links from unused bandwidth reclaimed from another path on each link.

9. A computer readable medium embodying program instructions for execution by a computer, the program instructions adapting a computer to allocate bandwidth within a network domain, program instructions comprising:
  accessing a database including path-level data comprising path Quality of Service (QoS) infomation and link-level data comprising link Quality of Service (QoS) information for a path within the network domain, each path comprising a plurality of links, the path-level data being summarized from the link-level data of the links of each path;
  receiving from a network domain edge node a flow request for a path;
  satisfying the flow request using the path-level data pertaining to the path if the flow request can be satisfied using the path-level data; and
  satisfying the flow request using the link-level data pertaining to the links included in the path if the flow request cannot be satisfied using the path-level data.

10. The computer readable medium of claim 9, wherein the path-level data includes unused bandwidth allocated to the path and a path state, the program instructions further comprising satisfying the flow request using the unused bandwidth if the path is not in a critical state and the path has enough unused bandwidth to satisfy the flow request.

11. The computer readable medium of claim 10, wherein the link-level data further includes quotas of bandwidth available to a link, the program instructions further comprising allocating to each link along the path a quota of bandwidth from the quotas of bandwidth available to the link if the path does not have enough unused bandwidth to satisfy the flow request.

12. The computer readable medium of claim 11, wherein the link-level data further includes a link state and the path-level data further includes a set of critical links along the path, the program instructions further comprising allocating bandwidth to each link in the set of critical links from unused bandwidth reclaimed from another path on each link.

13. A method for allocating bandwidth within a network domain by a bandwidth broker operably coupled to a network domain edge node, comprising:
  accessing a network QoS state database operably coupled to the bandwidth broker, the network QoS state database including:
    path-level data for a path within the network domain, the path level data including unused bandwidth allocated to the path; a set of critical links along the path; and a path state; and
    link-level data for links along the path, the link level data including QoS information for links within the network domain; quotas of bandwidth available to a link; and a link state;
  receiving a flow request for the path;
  satisfying the flow request using the unused bandwidth if the path is not in a critical state and the path has enough unused bandwidth to satisfy the flow request;
  allocating to each link along the path a quota of bandwidth from the quotas of bandwidth available to the link if the path is not in a critical state and the path does not have enough unused bandwidth to satisfy the flow request; and
  allocating bandwidth to each link in the set of critical links from unused bandwidth reclaimed from another path on each link if the path is in a critical state.

14. A method for allocating bandwidth within a network domain by a network server coupled to a network domain edge node, the network domain including links for connecting two nodes and paths including one or more links for connecting two edge nodes, the method comprising:
  receiving a flow request from the network domain edge node for data flow through a first path, the flow request requiring a flow bandwidth;
  obtaining path-level data for the first path from a database coupled to the network server, the database including link-level data and the path-level data, the link-level data having available bandwidth and reserved bandwidth information for the links within the network domain and the path-level data having available bandwidth and reserved bandwidth information for paths within the network domain, the path-level data being summarized from the link-level data, the link-level data dividing the links into critical links and non-critical links and the path-level data dividing the paths into critical paths and non-critical paths, a critical link being a link having an available bandwidth below a threshold and a critical path being a path including at least one critical link;
  granting the flow request if the flow bandwidth is satisfied by a first bandwidth, the first bandwidth being an available bandwidth of the first path and being obtained from the path-level data;
  obtaining link-level data for all links along the first path if the first path is a non-critical path and if the flow bandwidth is not satisfied by the first bandwidth;
  requesting more available bandwidth for all the links along the first path;
  obtaining link-level data for the at least one critical link along the first path if the first path is a critical path;
  requesting more available bandwidth for the at least one critical link and for the non-critical links to obtain a second bandwidth for the first path;
  updating the available bandwidth of the first path in the path-level database;
  granting the flow request if the flow bandwidth is satisfied by the second bandwidth; and
  rejecting the flow request if the requesting more available bandwidth for any of the links is rejected.

15. A method for dynamic allocation of bandwidth within a network domain having nodes including core nodes and edge nodes, a link connecting two nodes, a path connecting two edge nodes and including one or more links, each link belonging to no paths, one path, or more than one paths, data flowing from a first edge node to a second edge node through a path connecting the first edge node to the second edge node, the method comprising:

dividing total bandwidth of each link into a plurality of quotas, a quota being a discrete amount of bandwidth larger than an average bandwidth requirement of data flow in the network domain;

dividing the plurality of quotas of each link among the one or more paths passing through the link and including the link by allocating one quota to each path;

maintaining a link state of each link, the link state being a critical state if available bandwidth of the link is below a threshold value and otherwise being a normal state, a link in the critical state being a critical link and a link in the normal state being a normal link;

maintaining a path state of each path, the path state being a critical path state if the path includes at least one critical link, a path in the critical path state being a critical path;

maintaining bandwidth use of each path, each path having a reserved bandwidth and an available bandwidth, a sum of the reserved bandwidth and the available bandwidth equaling a total path bandwidth;

receiving a flow request through a first path for a first data flow requiring a first data bandwidth;

if the first path is not a critical path and if available bandwidth on the first path is not smaller than the first data bandwidth, granting the flow request;

allocating more quotas to all of the links of the first path if the first path is not a critical path and if the available bandwidth of the first path is smaller than the first data bandwidth and granting flow request if the available bandwidth of the first path is no longer smaller than the first data bandwidth;

allocating more quotas to the one or more critical links of the first path if the first path is a critical path and granting flow request if the first path is no longer a critical path and if available bandwidth on the first path is not smaller than the first data bandwidth; and rejecting the flow request if sufficient number of quotas are not available for allocating more quotas to the critical links or to the normal links and if the first path is a critical path or if the available bandwidth of the first path is smaller than the data bandwidth.

16. A method for dynamic allocation of bandwidth within a network domain having nodes including core nodes and edge nodes, a link connecting two nodes, a path connecting two edge nodes and including one or more links, each link belonging to no paths, one path, or more than one paths, data flowing from a first edge node to a second edge node through the path connecting the first edge node to the second edge node, the method comprising:

dividing total bandwidth of each link into a plurality of quotas, a quota being a discrete amount of bandwidth larger than an average bandwidth requirement of data flow in the network domain;

dividing the plurality of quotas of each link among the paths passing through the link and including the link by allocating one quota to each path;

maintaining a link state of each link, the link state being a critical state if available bandwidth of the link is below a threshold value and otherwise the link state being a normal state, a link in the critical state being a critical link and a link in the normal state being a normal link;

maintaining bandwidth use of each link, each link having a reserved bandwidth and an available bandwidth, a sum of the reserved bandwidth and the available bandwidth equaling a total link bandwidth;

maintaining a path state of each path, the path state being a critical path state if the path includes at least one critical link, a path in the critical path state being a critical path;

receiving a flow request from a first path for data flow through a first link, the flow request requiring a flow bandwidth;

rejecting the flow request if the first link is a critical link;

if the first link is not a critical link, collecting residual bandwidth of the all the paths including the first link by obtaining a sum of the quotas of the first link allocated to each of the paths including the first link and subtracting the sum from a total bandwidth of the first link to obtain an available bandwidth for the first link;

if the available bandwidth of the first link is smaller than the flow bandwidth, rejecting the flow request; and if the available bandwidth of the first link is not smaller than the flow bandwidth,
  granting the flow request,
  decreasing the available bandwidth of the first link by one quota, and
  if the available bandwidth minus the flow bandwidth is below the threshold value, updating the link state of the first link and the path state of the paths including the first link to the critical state, wherein the flow request is a request for a quota on the first link or a request for a data flow rate.

* * * * *